United States Patent [19]

Stauffer

[11] 4,425,665

[45] Jan. 10, 1984

[54] FSK VOICEBAND MODEM USING DIGITAL FILTERS

[75] Inventor: Michael K. Stauffer, Redwood City, Calif.

[73] Assignee: Advanced Micro Devices, Inc., Del.

[21] Appl. No.: 305,014

[22] Filed: Sep. 24, 1981

[51] Int. Cl.³ .................... H04L 27/10; H04L 27/18
[52] U.S. Cl. ...................................... 375/9; 332/9 R; 329/107; 375/45
[58] Field of Search .................. 332/9 R, 9 T, 10; 329/104, 105, 107; 375/9, 44, 45, 52

[56] References Cited

U.S. PATENT DOCUMENTS 3,937,882  2/1976  Bingham .............................. 375/8
4,336,613  6/1982  Hewes ................................. 375/9

*Primary Examiner*—Benedict V. Safourek
*Attorney, Agent, or Firm*—Patrick T. King; Gary T. Aka

[57] ABSTRACT

An asynchronous FSK modulator-demodulator (modem) having a capability of operating at data rates of 300, 600 and 1200 bits per second in a voiceband telephone channel is compatible with the specifications of the Bell 103/113, Bell 202, CCITT V.21 and CCITT V.23 modem types. The modem according to the invention is incorporated into a single integrated circuit to minimize external components in a system. The modem is pin programmable, that is, the mode and speed of operation is defined by a parallel digital data signal applied to device terminals. Digital signal processing techniques are employed to perform all major functions, including modulation and filtering. Multiplication functions are performed without need for multipliers by employing shift registers and canonic sign arithmetic. Analog-to-digital conversion and digital-to-analog conversion circuits are incorporated into the device.

10 Claims, 4 Drawing Figures

FSK VOICEBAND MODEM USING DIGITAL FILTERS

BACKGROUND OF THE INVENTION

1. Field of the Invention

This invention relates to telecommunication interface circuitry incorporating modulators and demodulators (modems) which operate according to frequency shift keyed (FSK) techniques. Communication of digital data over telephone lines requires the use of interface circuitry for converting serial digital data to an analog signal which is compatible with the characteristics of a telephone line or other communication channel. The interface generally includes a device known as a modem, which is operative to convert an asynchronous serial digital data stream into an analog signal compatible with the transmission characteristics of specific types of channels such as a voiceband channel and which receives an analog signal over such a channel and converts the analog signal into a digital data stream. Various communication standards have been established for communication over telephone lines. A typical form of communication is by frequency shift keyed (FSK) modulation in the data rate range of 300-1200 symbols per second. FSK modulation comprises transmission of one bit of information per symbol wherein the bit value is determined by the selection of one of two preselected frequencies.

Standards have been adopted in the United States and in Europe for asynchronous serial communication employing FSK modulation. These standards are incorporated into the modems known as the Bell 103/113 and Bell 202 in the United States and the CCITT V.21 and V.23 modems in Europe. In addition, standards have been established for interface control for asynchronous serial data communication. EIA Standard RS-232C defines essential terminal control signals required for communication over serial asynchronous lines. CCITT Standard V.24 specifies the essential terminal control signals for the European standard equipment. A relatively inexpensive single-chip programmable modem is likely to find wide application and acceptance in telecommunications. For example, a particular application is in terminals of remote access information systems such as the British VIEWDATA system, the French Postal Telephone and Telegraph electronic telephone directory, the Advanced Communication System of American Telephone and Telegraph Company, as well as in terminals used for remote diagnosis of computers and instruments.

DESCRIPTION OF THE PRIOR ART

In the past, in order to communicate over telephone lines, modems have been required that were dedicated to a particular standard and speed. Modems of one type generally have not been able to communicate with modems of another type. However, systems have been constructed which incorporate more than one type of modem whereby communication can be had with modems of various standards and types.

Heretofore, low-speed FSK modems have been implemented using numerous analog circuits including frequency domain filters, detectors and modulators. Such an approach is reasonably economical when a single mode of operation is desired. It is also much more economical to implement an FSK modem using discrete analog components than to attempt to implement an FSK modem from numerous discrete digital circuits. Digital filters, particularly as heretofore contemplated, are complex structures requiring a great deal of hardware and substantial power. Moreover, digital structures require use of digital-to-analog and analog-to-digital converters. An arithmetic logic unit, read only memory (ROM) and random access memory (RAM) are also required to implement the digital filter structures. Therefore, a very simple single purpose digital filter requires nearly as much silicon hardware as a complex multiple mode digital filter.

Another problem in using digital filters for such applications has been power dissipation due to the large amount of arithmetic processing. Typical digital filters require high-speed multipliers which dissipate a great deal of the power. Telecommunication systems require very low power dissipation. Analog filters have tended to be of lower power dissipation than digital filters. Consequently, prior art implementations have historically used an analog approach rather than a digital approach.

Heretofore, it has not been possible to construct an FSK modem in a single integrated circuit in either analog or digital form. An analog circuit solution is such that substantial limits are placed on the amount of integration which can be incorporated into a single silicon circuit die. A single circuit die digital implementation has not been practical heretofore because of speed and manufacturing process limitations. Indeed, the cost of implementing a digital circuit for a dedicated, i.e., single mode, application suggests against the digital implementation of an FSK modem.

SUMMARY OF THE INVENTION

In order to overcome the problems encountered in the prior art, a single integrated circuit is provided which is preselectively configured to be compatible with a plurality of existing FSK modulator-demodulator (modem) speeds and standards. The apparatus according to the invention implements digitally programmable time domain digital filtering, digital detection, digital signal synthesis and both analog-to-digital and digital-to-analog conversion on a single circuit die with minimal external connections. In each configuration, arithmetic logic, data paths and memory devices are shared. The filter response is determined by preselectable coefficient values stored in memory devices. Therefore, all filter characteristics may be implemented simply by modifying the coefficients. The coefficients may be predetermined and stored for use in memory means. The predetermined coefficients are called up and implemented in the filters by an externally applied parallel digital signal which instructs the device as to the selection of coefficients and the standards of operation. Special function processing is implemented by efficient table look-up schemes. Multiplication is simplified by use of a number base requiring only bit shifting of digital places.

In comparing filter cost (based on silicon area) versus the complexity (or the degree of difficulty) and performance required from the filter, it has been noted that with analog types of filters the cost increases in a linear proportion to the complexity. However, in the case of digital filters, even though a high initial cost is paid, the cost of adding certain types of additional complexity is greatly reduced. One reason for this is that digital filters can multiplex and time share hardware whereas analog filters cannot. The digital filter also requires no precision components whereas the analog filter requires a large number of precision components (which may have to be trimmed and must have a very low drift) in order to meet performance specifications.

In a preferred embodiment according to the invention, N-channel MOS technology is employed to provide a 28-pin apparatus capable of being pin programmable to define a plurality of existing FSK modem standards. Phone line interface must be provided externally through a data access arrangement (DAA) or acoustic coupler for connecting the apparatus to the telephone line. A universal asynchronous receiver transmitter (UART) may be employed to connect the apparatus to a data terminal. The transmitter comprises a sine wave synthesizer receiving a signal from a UART with the synthesizers operating frequency selected by the digital modulating signal, programmable digital bandpass filters, a digital-to-analog converter for coupling to a telephone connection. The receiver comprises an analog-to-digital converter operative to receive an analog signal from the telephone line and to convert it to a digital form, programmable digital bandpass filters, and a carrier detector and information demodulator for recovering a digital data stream. Appropriate interface control circuitry is provided whereby required control signals are generated according to the appropriate interface standards.

It is a primary objective of the present invention to provide a novel multiple mode FSK modem circuit in which all signal processing is accomplished digitally after the input signals have been converted to digital form.

Still another object of the present invention is to provide improved digital filtering techniques for use in the signal processing portions of telecommunications apparatus.

The invention will be better understood by reference to the following detailed description taken in connection with the accompanying drawings.

REFERENCE TO RELATED PATENT APPLICATIONS

The following patent applications are incorporated herein by reference and made a part hereof for the purpose of teaching technology relevant to elements of the present invention, that is for purposes of indicating the background of the invention or illustrating the state of the art. All three patent applications have PCT International Publication Dates of Dec. 24, 1981.

Russell Jay Apfel, Ser. No. PCT/U.S. 80/00752 filed June 18, 1980 entitled INTERPOLATIVE ENCODER FOR SUBSCRIBER LINE AUDIO PROCESSING CIRCUIT APPARATUS;

Russell Jay Apfel et al., Ser. No. PCT/U.S. 80/00753 filed June 18, 1980 entitled INTERPOLATIVE ANALOG-TO-DIGITAL CONVERTER FOR SUBSCRIBER LINE AUDIO;

Russell Jay Apfel et al., Ser. No. PCT/U.S. 80/00754 filed June 18, 1980 entitled SUBSCRIBER LINE AUDIO PROCESSING CIRCUIT APPARATUS.

DETAILED DESCRIPTION OF SPECIFIC EMBODIMENTS

Figure 1:
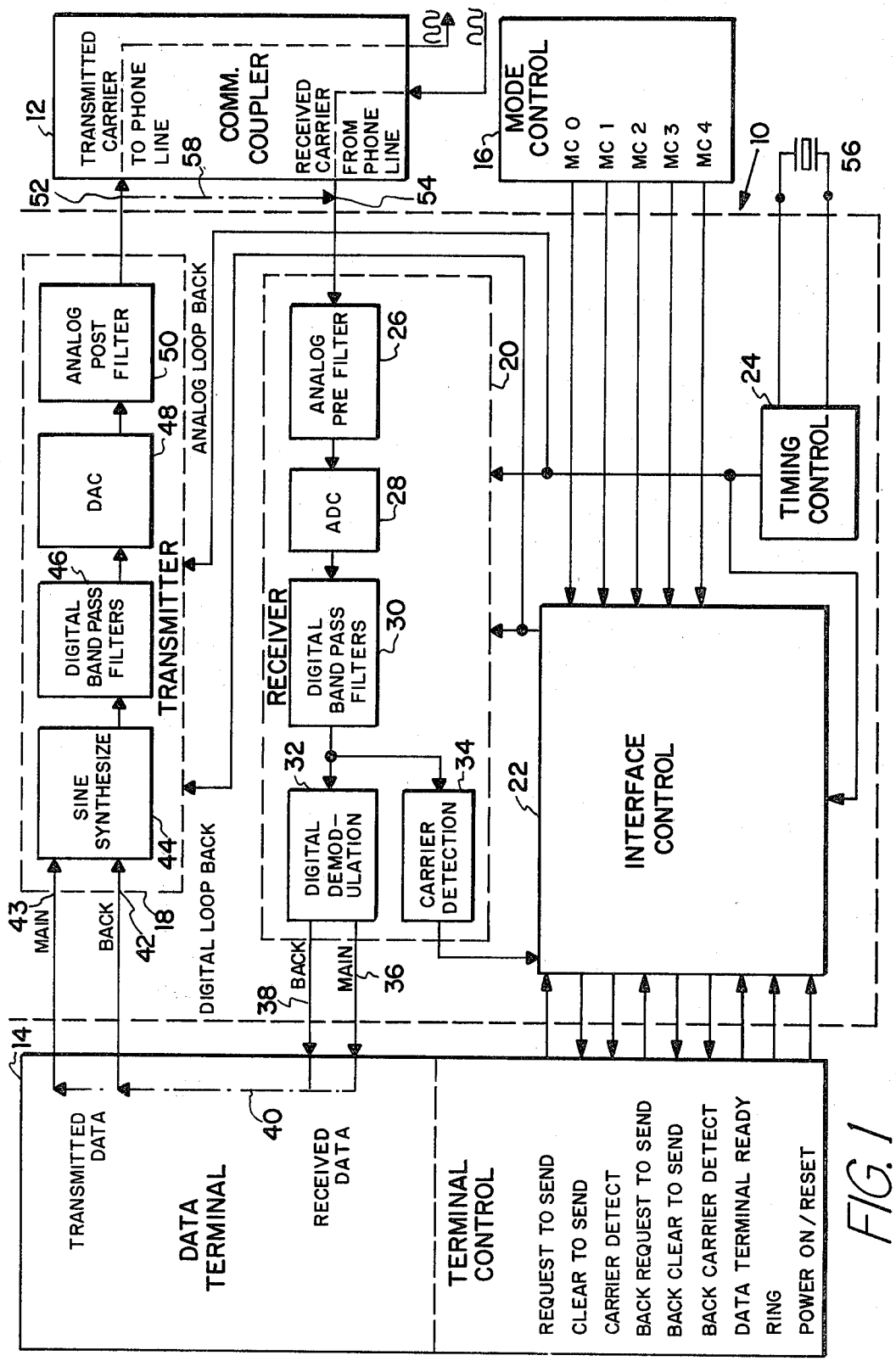
FIG. 1 is a block diagram of a system in which an apparatus according to the invention is incorporated.

Referring now to FIG. 1, a block diagram is shown of an FSK modulator-demodulator (modem) 10 according to the invention for use with a communication coupler 12 and a data terminal 14. A typical communication coupler 12 is an acoustic coupler or a data access arrangement (DAA) specified by the communication equipment supplier. The communication coupler 12 is contemplated to interface with a voiceband communication channel through which is communicated frequency shift keyed signals in the 300–1200 baud speed range.

The data terminal 14 is one of a variety of data terminal equipment (DTE) adapted to receive and to transmit serial asynchronous data under control of certain terminal control signals as for example those specified by EIA Standard RS-232C and CCITT V.24. A universal asynchronous receiver transmitter (UART) may be incorporated in the data terminal equipment. The modem 10 provides or is adapted to receive nine different terminal control signal bits for "handshake" control. In addition, the modem 10 is adapted to receive five bits specifying selected operational modes. A mode control device 16, which may be a bank of TTL compatible switches or hard wired connections, provides external mode control to specify the speed of operation and signal characteristics of the modem 10.

In general, the modem 10 consists of transmitting means 18, receiving means 20, and interface control means 22 with timing control means 24. The communication coupler 12 provides a coupling from the phone line to the receiver 20. The receiver signal path includes an analog prefilter 26, an analog-to-digital converter (ADC) 28, digital bandpass filtering means 30, digital demodulation means 32 and carrier detection means 34. In operation, asynchronous serial data is provided either through a main channel output 36 or a back channel output 38. The back channel output may be coupled through a digital loopback 40 to a transmitted data back channel input 42 of the transmitter 18. A carrier detect signal from carrier detection means 34 is coupled to the interface control means 22. A corresponding carrier detect output terminal of the interface control 10 is coupled to the data terminal 14.

The transmitted signal path from the data terminal 14 to the communication coupler includes sine wave synthesizing means 44, digital bandpass filtering means 46, digital-to-analog converter means (DAC) 48 and analog low-pass filter means 50. At the option of the user, an analog loopback may be provided between the carrier output terminal 52 and the received carrier input terminal 54. In addition, timing control means 24 under control of a crystal 56 or other suitable clock, provides the timing control signals to the transmitter 18, receiver 20 and interface control 22. The interface control 22 is a state machine which, in response to applied mode control signals and terminal control signals configures the transmitter 18 and receiver 20.

The modem 10 according to the invention is preferably fabricated using N-channel MOS technology in a 28-pin integrated circuit package in which all digital input and output signal terminals are compatible with TTL-type logic levels.

The five mode control input bits MC0, MC1, MC2, MC3 and MC4 specify normal operational modes and special loopback operational modes between the transmitter 18 and the receiver 20. For example, the mode control may specify the following normal configurations:

Bell 103 Originate 300 bps full duplex
Bell 103 Answer 300 bps full duplex
Bell 202 1200 bps half duplex
Bell 202 with equalizer 1200 bps half duplex
CCITT V.21 Originate 300 bps full duplex
CCITT V.21 Answer 300 bps full duplex
CCITT V.23 Mode 2 1200 bps half duplex
CCITT V.23 Mode 2 with equalizer 1200 bps half duplex
CCITT V.23 Mode 1 600 bps half duplex.

In the above normal operational modes, the interface control 22 sets the transmit and receive filter to the correct channel frequency band for operation according to the selected FSK modem characteristic. Digital loopback 40 and analog loopback 58 are available external pin connections. Specifically, digital loopback may be made between the back channel output terminal 38 or main channel output terminal 36 and the back channel input terminal 42 or main channel output terminal 43.

Selected "handshaking" control bits are provided to the interface control 22. These include Data Terminal Ready, which is used to indicate that the data terminal 14 desires to send and/or receive data via the modem 10; Request To Send, which instructs the modem 10 to enter its transmit mode; Clear To Send, by which the interface control 22 indicates to the data terminal 14 that data may be transmitted; Carrier Detect, which is a signal from the interface control 22 to the data terminal 14 indicating that a valid carrier signal, as sensed by the carrier detector 34, has been present for at least a minimum amount of time. The Carrier Detect values for the length of time a valid carrier has been detected (or conversely, has not been detected) are configuration dependent, and as such are programmed by the mode control 16.

In certain modems, particularly the 1200 bps modem configurations, only half duplex operation is permissable over two-wire lines. Therefore, a narrowband backward channel is provided for transmission from the main channel receiver and to the main channel transmitter. It is for this purpose that the back channel terminals are provided. "Handshaking" control bits are also provided for the back channels, specifically Back Request To Send, Back Clear To Send and Back Carrier Detect.

In addition, there are provided a Power On/Reset signal bit, which is used to turn on the modem 10 and to initialize its conditions and a Ring signal, which is used to initiate an automatic answering sequence.

Transmitter Operation

The transmitter 18 is operative to receive serial binary digital data from a data terminal 14 or other appropriate source and to convert that data to an analog signal modulated by frequency shift keyed modulation in accordance with the standard of the modem type specified. The analog signal at the carrier output terminal 52 is applied to the phone line within the power and spectrum limitations imposed by the characteristics of the channel. FSK modulation encodes one bit per baud wherein a logical one input bit induces a sine wave signal at a first frequency and a logic zero induces a sine wave at a second frequency. Switching the data value between the two logic states causes the signal at the carrier output terminal to switch between the two frequencies, preferably with continuous phase transition. In order to generate the desired sine wave at the desired frequency, a sine wave synthesizer 44 is provided. The sine wave is produced by a table look up function, the output of which is strobed by a clock at a fixed frequency. The increment size in the address to the table look up function controls the frequency of the sine wave output.

The frequency shift keying process generates energy outside the primary information band. These sidebands are preferably attenuated in order to minimize the possibility of interference with adjacent channels and particularly with a related channel in a full duplex system. Digital time domain bandpass filters 46 with preselectable weighting coefficients are employed to attenuate the spurious sidebands. The digital-to-analog converter 48 receives the digitally filtered signal, converts it to the corresponding analog signal and conveys it on to the output. An analog post filter 50 is provided at the output of the digital-to-analog converter 48 as a low-pass filter. Because of the provision of precisely-controlled digital filters and high sample rate of the converter 48 the post filter 50 may be a simple single pole R-C circuit, which need not be constructed of precision components.

RECEIVER OPERATION

The receiver 20 is operative to receive FSK modulated signals from a telephone channel in the form of an analog carrier signal. The carrier signal is applied to a prefilter 36, which is a simple anti-aliasing single pole R-C low-pass filter. The output of the prefilter 36 is applied to an analog-to-digital converter 28 and then through digital bandpass filters 46 to improve the signal to noise ratio and to separate independent channel frequencies which may be associated with full duplex configurations. The digitally filtered output is then digitally demodulated by a digital demodulator 32 to recover the binary data. In addition, the Carrier Detect signal is digitally extracted through carrier detector 44 in order to indicate the presence of valid data applied to the receiver 20.

INTERFACE CONTROL OPERATION

The interface control 22 supervises and directs the mode control selection and handshaking operations of the modem 10. The interface control 22 consists primarily of delay generation counters, two-state machines operative to control the transmission and reception of control data, and mode control logic for selecting proper transmit frequencies, transmit and receive filter configurations and the like. Specifically, the interface control 22 includes two-state machines, one of which indicates main or back channel transmission and the auto-answer sequence associated with auto-answering functions of modems and another which implements reception on either the main or the back channel. Although two external terminals are shown, only one transmit channel and one receive channel are employed internally. In operation, this first state machine goes through an initialization sequence to assign initial conditions to different signals and to wait for the actuation of the Data Terminal Ready signal. Once the Data Terminal Ready signal is activated, the modem 10 becomes operational in accordance with the specified modem characteristics. In normal half duplex operation, a modem is either transmitting on the main channel and receiving on the back channel or vice versa. According to the invention, the transmitter and receiver filters of the modem 10 are set to the proper channel in accordance with a signal expected to be applied at the signal input. When Request To Send is asserted, the transmitter bandpass filters 46 and sine wave synthesizer 44 are set to transmit on the main channel frequencies and the receiver filters 30 are set to receive on the back channel frequencies. In full duplex operation, the state machine configures the transmitter 18 and receiver 20 for receiving or transmitting data simultaneously. Two independent 300 Hz channels are normally frequency multiplexed into a 3000 Hz bandwidth of the phone line. Data transmission is initiated by asserting the Request To Send signal. The transmitted Data Input will be released internally from its standby Mark condition (logic 1) to a Space condition (logic 0), and a modulated carrier will be caused to appear at the transmitted carrier output terminal 52. Following a preselected delay, the Clear To Send signal is asserted, permitting data to be transmitted through the main channel input terminal 43. Data transmission continues until the Request To Send signal is dropped. Following a preselected delay, the Clear To Send signal is dropped.

In full duplex operation, data reception, as indicated by a Carrier Detect signal, may appear at any time after communication with another modem has been established. When the receiver 20 detects a valid carrier for at least a predetermined length of time, the output Carrier Detect signal is asserted and the main received data output is released so that valid data can be received at the received data terminal 36. Data is accepted until the receiver detects loss of the carrier for at least a predetermined length of time whereupon the Carrier Detect output is released and the Receive Data output is clamped to one of its logic levels, typically the Mark level. The interface controller 22 is preferably implemented by means of simple counters and a programmed logic array or read only memory which is preloaded with preselected values to preset the counters.

Figure 2:
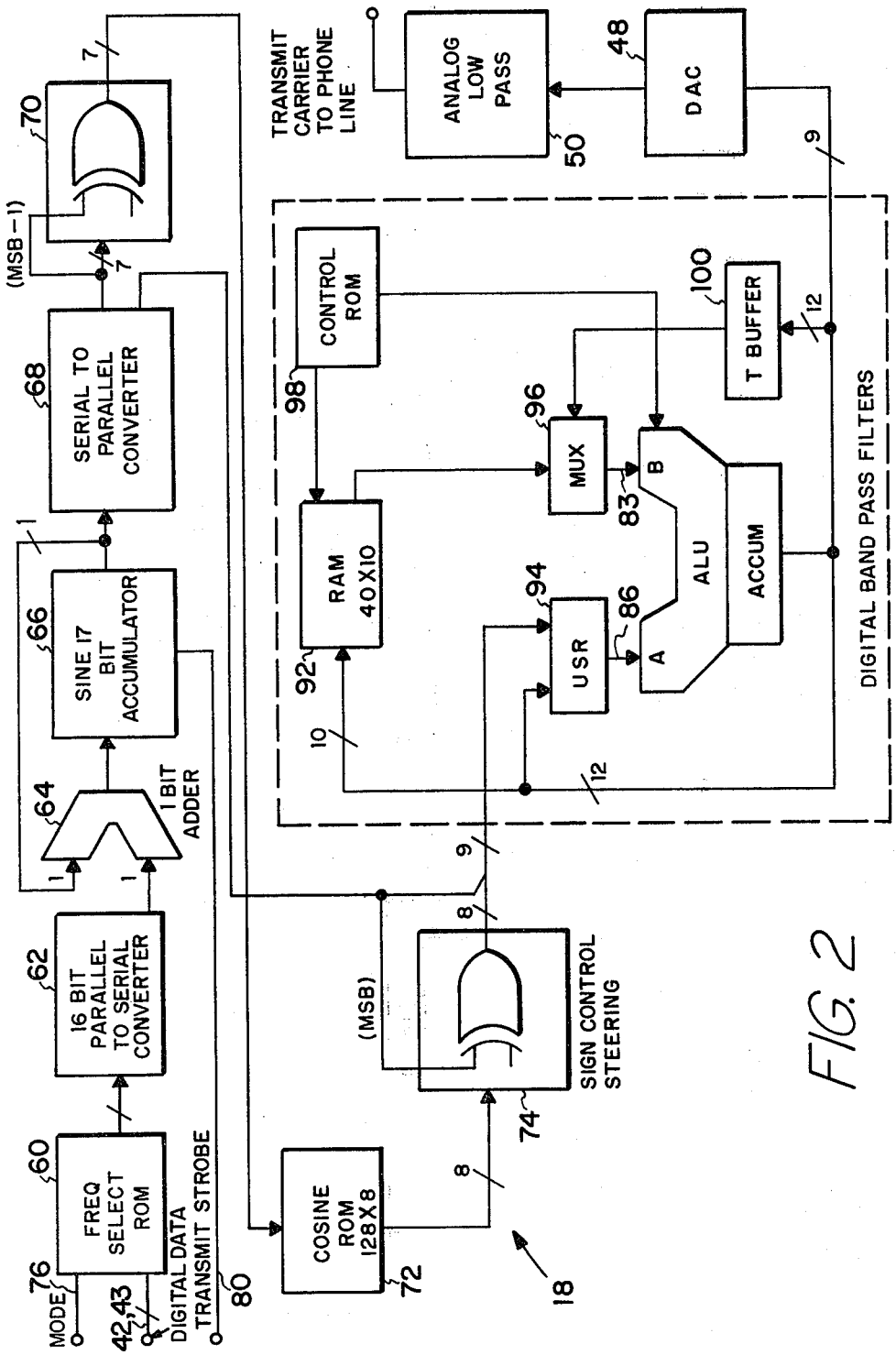
FIG. 2 is a detailed block diagram of the transmitter signal processing chain according to the invention.

Turning now to FIG. 2 there is shown a detailed block diagram of the transmitter signal processing chain according to the invention. The transmitter 18 includes a frequency selection means 60, a parallel to serial converter 62, a 1-bit adder 64, a serial accumulator 66 having one more bit capacity than the converter 62, a serial to parallel converter 68, a bank of first EXCLUSIVE OR gates 70 coupled to receive selected most significant bits of the converter 68, a cosine read only memory (cosine ROM) 72 addressed by the first XOR gates 70 and in which is stored the values for one quadrant of a sine wave, and a sign control steering means 74. Elements 60, 62, 64, 66, 68, 70, 72 and 74 comprise the sine synthesizing means 44. Other types of digital sine synthesizing means are known. For example, Wavetek of San Diego, Calif. markets function generators incorporating digital sine synthesizers.

The output of the sign control steering means 74 including the sign value of the sine wave is coupled to the digital bandpass filter means 46, the output of which is coupled to digital-to-analog converter 48, the analog output of which is coupled to the analog post filter 50. The transmitter 18 has four external inputs, namely, the digital data input at data terminal 42 or 43 (FIG. 1), a mode select input 76 from the interface control 22 (FIG. 1), and the transmit strobe input 80, which is a constant, relatively high frequency clock under control of the timing control means 24 (FIG. 1).

The frequency selection means 60 is typically a read only memory with a capacity of seventeen words of at least twelve bits length. Each word specifies a different frequency. The output of the frequency selection means 60 is a constant which establishes increment size proportional to a characteristic frequency. The increment size value is applied to the parallel to serial converter 62. The most significant bits of the converter 62 are loaded with leading zeros to establish a 16-bit word. The 16-bit word is converted to a serial pulse train which is applied to a first input of the 1-bit adder 64. The second input of the 1-bit adder 64 is a feedback line 82 from the single bit output of the serial accumulator 66. The serial accumulator 66 serially accumulates a value representing the address of value in a continuous sine or cosine function. A phase continuous shifting of frequency is automatically established by selection of the increment size. The serial to parallel converter 68 converts the accumulator 66 output to parallel format. The seven most significant bits are applied to the bank of gates 70. Each EXCLUSIVE OR gate 70 is operative to mask the second most significant bit with each of the seven input bits. The resultant output of the bank EXCLUSIVE OR gates 70 is a 7-bit address. This output is applied to the cosine ROM 72, which is a 128-word 8-bit read only memory which stores the value of 128 samples of a sine wave in a quadrant. The sine wave accumulator 66 in connection with the EXCLUSIVE OR gates 70 generate the address of the selected sample of the sine wave. The 8-bit output of the cosine ROM 72, which is the value of the sine wave sample is applied to the sign control steering means 74, which is also a set of EXCLUSIVE OR gates. The sign is generated by EXCLUSIVE ORing the most significant bit of the serial to parallel converter 68 with each bit of the 8-bit value causing a ones complement of the ROM value when the MSB is one or allowing pass through of the ROM value when the MSB is zero and by appending the most significant bit as the ninth bit of the output bus of the sign control means 74.

The output of the sign control steering means 74 is applied to the bandpass filter means 46. The bandpass filter means 46 comprises a simple data processor centered around an arithmetic logic unit (ALU) 84 having two input ports 86 and 88, an output accumulator 90, a 40-word random access memory (RAM) scratchpad 92, a universal shift register (USR) 94, and two-input multiplexer whose output is the input shifted left or right up to seven bits and which is coupled to input port A 86, a multiplexer (MUX) 96 coupled to input port B 88, a control read only memory (ROM) 98, and a temporary buffer or holding register (T buffer) 100. A version of the filter structure is incorporated in the Am7901 manufactured by Advanced Micro Devices of Sunnyvale, Calif. and described in the patent disclosures incorporated herein by reference.

In the preferred configuration of the invention, the USR 94 is coupled to receive the digital input signal from the sign control steering means 74 at one multiplexed input, and the output of the accumulator 90 is applied to another multiplexed input of the USR 94. The output of the accumulator 90 is also applied to the T buffer 100 and to the DAC 48. The output of the T buffer 100 is multiplexed with the data output of the RAM 92 at MUX 96. The RAM 92 receives as data input the output data signals of the accumulator 90. The control ROM 98 controls the function of the ALU 84 and the address functions of the RAM 92. It should be understood that the other control signals are also employed to coordinate timing and like functions of the filter means 46. The USR 94 provides the multiplier function in the filter.

In the preferred embodiment of the invention, the digital filters 30, 46 use a modified form of canonic sign digit arithmetic with the minimum ones implementation. The canonic sign digit form of arithmetic is based on the use of three values, $-1$, $0$, and $+1$. Consequently, there may be more than one representation of a particular value. The choice of representation is that with the minimum number of ones. The minimum ones implementation enables the elimination of clock pulses in a serial implementation and also eliminates the need to use an array multiplier as is the case with a more straightforward implementation of digital signal processing algorithms. The structure of the digital filters 30, 46 is particularly well adapted for implementing the programmable digital bandpass filters with fixed or slowly changing coefficients selected to pass the desired frequencies of the modulated FSK signal while rejecting all other frequencies. The parameters or coefficients which specify the filter characteristic are preselected according to the time domain characteristic of the bandpass function and then addressed in the appropriate data retrieval position of the control ROM 98 implementing the function in response to the mode control setting. The filters 30, 46 are a set of direct canonic second order sections in which multiplication is carried out by shifting bit positions in the USR 94 and in which additions and subtractions are carried out through the arithmetic logic unit 84.

Figure 3:
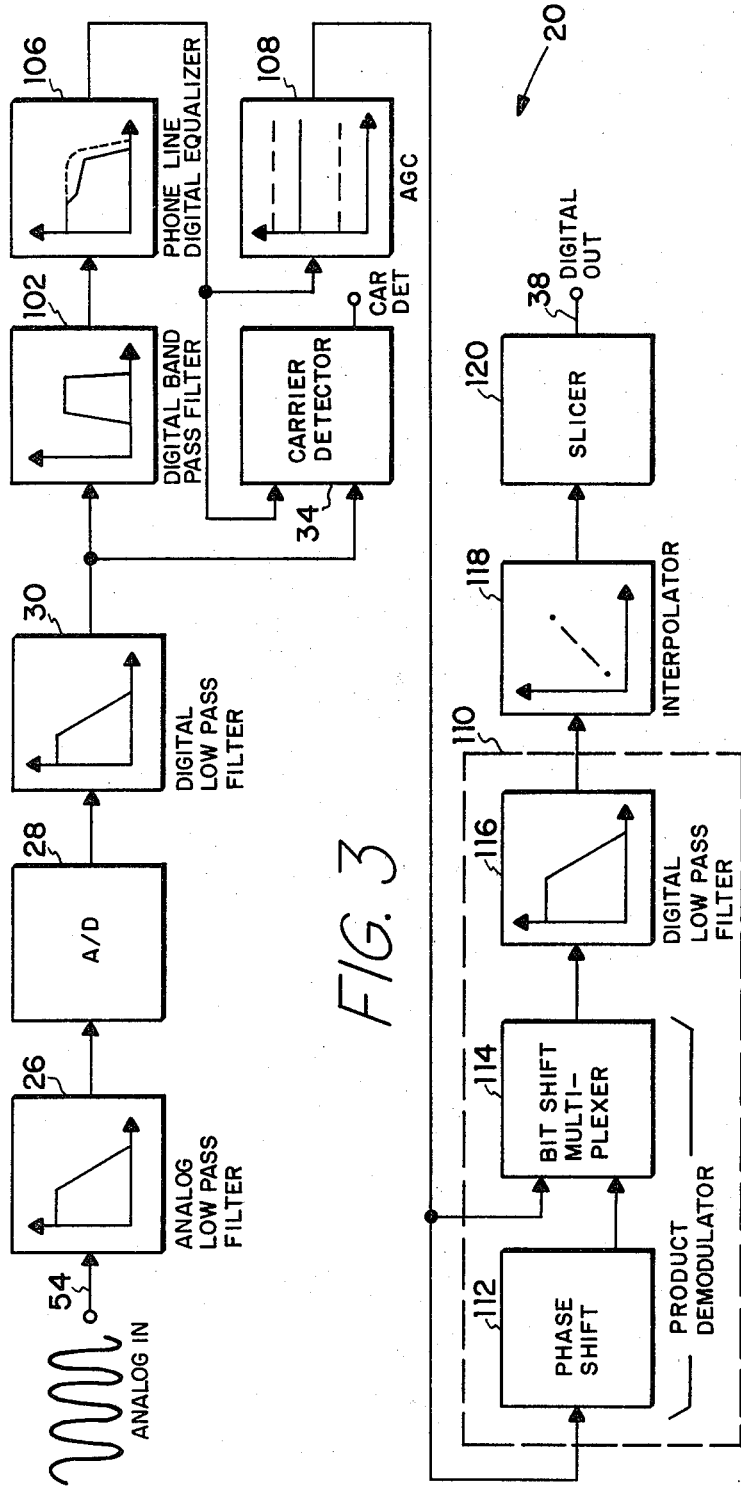
FIG. 3 is a detailed block diagram of a receiver signal processing chain according to the invention.

Turning now to FIG. 3, there is shown a receiver 20 in accordance with the invention. The receiver chain includes, from the analog input terminal 54, the analog prefilter 26, an analog-to-digital converter 28, a low-pass decimation filter 30, and the digital demodulator 32 with the carrier detector 34, which are both coupled to receive the output of filter 30. The receiver further comprises bandpass filter 102, phone line amplitude equalizer 106, optional automatic gain control means (AGC) 108, demodulation means 110 (which is preferably a phase shift type product demodulator consisting of a phase delay 112, bit shifting type multiplier 114 and low-pass filter 116), optional digital interpolator 118 and bit slicer 120. The digital filters and demodulator are incorporated into a signal processor of the structure described in connection with the transmitter filters.

The ADC 28 is preferably an interpolative converter of the type which converts the analog signal into a series of multibit binary words consisting of all zeros or a series of one or more zeros and a series of one or more ones, wherein the transition between the series of zeros and ones specifies the converted digital value. Versions of an interpolative analog-to-digital converter are described in publications of Bell Laboratories and elsewhere and are incorporated in the Am7091 manufactured by Advanced Micro Devices.

The low-pass filter 30 is preferably a decimation filter operating at a relatively low sampling rate relative to the sampling rate of the ADC 28 in order to prevent aliasing effects. In practice, the decimation filter 30 is merely a low-pass filter which "discards" samples in order to reduce the sampling rate and eliminate unnecessary processing considering the resolution of the data to be detected. The decimation filter 30 is a finite impulse response (FIR) type filter. The bandpass filter 102 comprises a structure similar to the structure of the filter means 46 of FIG. 2. While there are many choices for the filter structure, the preferred embodiment comprises six second order canonic sections of the infinite impulse response (IIR) form. The bandpass filter 102 is an elliptic filter, plus an all-pass group delay equalizer or all-pass filter with phase adjustment. The phone line equalizer 106 is used only in the high-speed mode to compensate for characteristics of the channel. It is an FIR type digital filter. The output of the filter group is applied to the optional automatic gain control 108, which is simply a device which shifts values toward the most significant bit to take full advantage of the system resolution. The carrier detector 34 is operative to receive either the fully equalized form of the signal (e.g., from either the bandpass filter 102 or the phone line equalizer 106) or the channel filtered output of the low-pass filter 30 in order to compare the signals for the presence of a carrier. The carrier detector 34 is operative to subtract the total signal from the in-band signal. In the absence of a sensed difference, the carrier detector 34 indicates the absence of a carrier.

The digital demodulator 110 takes full advantage of canonic sign arithmetic to extract the useful information from the digital data stream. The phase shifter 112 is a device which introduces a fixed delay which is the equivalent of a 90° delay at the center frequency between the modulation frequencies. An all-pass phase shift filter is readily implemented in digital form due to the ease of implementing delays and computing the relation between frequency and phase. The product demodulator 110 can then extract the demodulated carrier by multiplying the in phase and out of phase signals. The multiplier is a 10-bit shifter with add which is adapted to function with canonic sign arithmetic. The output of the multiplier 114 is applied to the low-pass filter 116 which may be a structure substantially identical to the low-pass decimation filter 30.

The output of the low-pass filter 116 is applied to an optional digital interpolator 118. The digital interpolator 118 is operative to reconstruct the demodulated signal in the neighborhood of the zero-crossing in order to more accurately estimate the time of modulation between the Mark and Space states of the FSK signal. One suitable interpolator 118 is disclosed in copending patent application Ser. No. 305,015 filed Sept. 24, 1981 in the names of Hans Peter Alfke and Michael K. Stauffer entitled "Zero Crossing Interpolator to Reduce Isochronous Distortion in a Digital FSK Modem", assigned to the same assignee as the present invention, and incorporated herein by reference.

The output of the interpolator 118 may be applied to a slicer 120 to extract the most significant bit from the output of the interpolator 118 as the digital signal output. The output of the slicer 120 is applied to the receive data terminal 38 as a serial binary digital data stream representing the recovered signal from the source transmitter. The slicer 120 may be incorporated into the structure of the interpolator 118 as the sign bit output.

Figure 4:
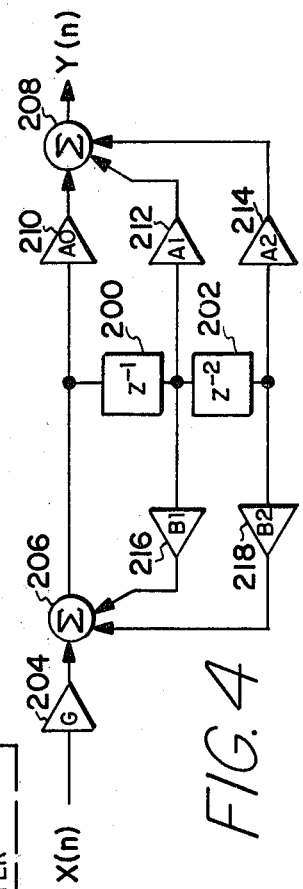
FIG. 4 is a diagram of a second order canonic filter section of the type employed in the bandpass filters in the transmitter and in the receiver.

Turning to FIG. 4, there is shown a typical second order canonic sign implementation of one second order section of the bandpass filters used in the receiver 20 and transmitter 18 of the invention. It is to be understood that the section is implemented as part of a structure such as the bandpass filter means 46 (FIG. 2).

A second order section consists of two delays, first delay 200 and second delay 202. A scaling amplifier 204 having gain G is placed in the input signal path to normalize the signal and to prevent internal overflow. The canonic section further includes two summing junctions, a first three input summer 206 and a second three input summer 208. In each signal path between the delays and the summers there are provided amplifiers, or more specifically coefficient multipliers, namely, $A_0$, $A_1$, $A_2$ in a feed forward line between the first summer 206 and 208. The $A_0$ coefficient multiplier 210 is in the position to represent signals having no delay between the input and the output. The $A_1$ coefficient multiplier 212 is in the position to represent one unit delay between the input and the output, and the $A_2$ coefficient multiplier 214 is in the position to represent a two unit delay between the input and the output.

Coefficient multipliers $B_1$ and $B_2$ are provided to represent feedback between the first and second delay positions and the input. Specifically, the $B_1$ coefficient multiplier 216 represents the value of feedback of a signal delayed by one unit to the first summer 206, and the $B_2$ coefficient multiplier 218 represents the feedback of a two unit delayed signal to the coefficient multiplier 206.

The structure of FIG. 4 is represented mathematically by the following equations, noting that the value $E_0(n)$ is at the output of the first summer 206, the value $x(n)$ is the input signal and the value $y(n)$ is the output signal:

$$E_0(n) = G \cdot x(n) - B_1 \cdot E_0(n-1) - B_2 \cdot E_0(n-2)$$

$$y(n) = A_0 \cdot E_0(n) + A_1 \cdot E_0(n-1) + A_2 \cdot E_0(n-2)$$

Using these two equations, all second order filter characteristics can be simulated in the time domain. Multiple second order sections can be cascaded, higher order sections may be constructed by chaining in parallel further unit delay means.

The invention has now been explained with respect to specific embodiments. Other embodiments will be apparent to those of ordinary skill in the art. It is therefore not intended that this invention be limited except as indicated by the appended claims.

I claim:

1. An integrated circuit apparatus for modulating and demodulating an analog signal with digital data, said apparatus transmitting and receiving the analog signal in preselected types of voiceband communication channels, said apparatus comprising:

means for modulating the analog signal with digital data and to produce a frequency shift keyed analog signal according to a selected one of a plurality of frequency shift keyed signaling standards;

means for transmitting the frequency shift keyed analog signal, said transmitting means includes means for digitally synthesizing digital representations of analog signals at selected frequencies, wherein the selected frequencies are selected according to the bit value of digital data supplied to said transmitting means;

wherein the means for digitally synthesizing digital representations of the analog signals at selected frequencies represents the analog signals as time-incremented digital signals;

means for incrementing the time-incremented digital signals to generate a digital representation of a sine wave signal having said selected frequency;

said transmitting means includes a digital-to analog converter for converting the digitally synthesized representations to modulated analog signals for exciting a voiceband communication channel;

means for receiving an analog frequency shift keyed signal and demodulating said signal according to the selected one of said plurality of frequency shift keyed signaling standards; and control means for preselecting said selected one of said plurality of signaling standards in accordance with the preselected type of voiceband communication channel.

2. The apparatus according to claim 1 wherein said synthesizing means includes means for generating continuous phase transitions between said select frequencies.

3. The apparatus according to claim 1 wherein said translating means comprises means responsive to a parallel digital word signal representing an incrementing constant for converting said parallel digital word into a serial bit stream;

means for adding each individual bit of said serial bit stream with each individual bit of a second bit stream;

means for serially accumulating a bit stream so added in synchronism with a clock signal to generate said second bit stream; and means for converting said second bit stream into a sequence of clocked parallel address signals for accessing a digital memory, wherein said incrementing constant specifies the size of the address increment thereby controlling the frequency of said analog output in a phase continuous manner.

4. The apparatus according to claim 3 wherein said synthesizing means comprises a digital memory in which is sequentially stored samples of values of at least a segment of a sine wave, said memory means being responsive to said sequence of address signals to generate a digital representation of a portion of a sine wave; and means for reconstructing a complete digital representation of a sine wave from said portion of a sine wave.

5. The apparatus according to claim 1 wherein said transmitting means further includes digital time domain filtering means having preselectable bandpass characteristics, said filtering means being operative to receive said digital modulating signals and to weight said signals according to said selected one of said signaling standards.

6. The apparatus according to said claim 5 wherein said filtering means comprises digitally programmable infinite impulse response signal processing means having stored sets of preselected weighting coefficients for each one of said signaling standards and having means for shifting bit places of digital value signals to perform multiplication.

7. The apparatus according to claim 1 wherein said receiving means comprises means for converting received analog signals to sampled digital representations of said analog signals for use in demodulating received signals.

8. The apparatus according to claim 7 wherein said receiving means further comprises digital time domain filtering means having preselectable low-pass and bandpass characteristics, said filtering means being operative to receive digital signals through said analog-to-digital converting means and weight said digital signals according to said selected one of said signaling standards.

9. The apparatus according to claim 8 wherein said filtering means comprises digitally programmable sections for low-pass filtering and digitally programmable sections for bandpass filtering, said digital programmable sections being incorporated in signal processing means, said signal processing means having stored sets of preselected weighting coefficients for use in each one of said sections according to each one of said signaling standards.

10. The apparatus according to claim 9 wherein said receiving means further includes product demodulating means incorporated into said signal processing means.

* * * * *